United States Patent
Garrick et al.

(10) Patent No.: US 8,469,642 B1
(45) Date of Patent: Jun. 25, 2013

(54) MODULAR PRECISION DRILL COUNTERSINK ASSEMBLY

(75) Inventors: Richard M. Garrick, Woodland Hills, UT (US); John A. Bunting, Provo, UT (US); David J. Preece, Payson, UT (US)

(73) Assignee: Precorp, Inc., Spanish Fork, UT (US)

( * ) Notice: Subject to any disclaimer, the term of this patent is extended or adjusted under 35 U.S.C. 154(b) by 715 days.

(21) Appl. No.: 12/724,223

(22) Filed: Mar. 15, 2010

Related U.S. Application Data

(60) Provisional application No. 61/161,489, filed on Mar. 19, 2009.

(51) Int. Cl.
*B23B 51/08* (2006.01)

(52) U.S. Cl.
USPC ............ 408/189; 408/225; 408/118; 408/145

(58) Field of Classification Search
USPC ................. 408/144, 145, 189–193, 226–227, 408/230, 231, 233, 238, 239 R, 713, 117–118, 408/223–225
IPC .............................................. B23B 51/08,51/10
See application file for complete search history.

(56) References Cited

U.S. PATENT DOCUMENTS

| | | | | |
|---|---|---|---|---|
| 4,353,670 | A | * | 10/1982 | Jorgensen ...................... 408/193 |
| 5,071,295 | A | * | 12/1991 | Greig ............................. 279/156 |
| 5,265,988 | A | * | 11/1993 | Schmigalla et al. .......... 408/225 |
| 5,915,895 | A | * | 6/1999 | Jager et al. ..................... 408/225 |
| 6,200,078 | B1 | * | 3/2001 | Kubota .......................... 409/74 |
| 7,090,447 | B2 | | 8/2006 | Jager et al. |
| 7,131,798 | B2 | | 11/2006 | Karlsson et al. |
| 7,147,409 | B2 | | 12/2006 | Wienhold |
| 2006/0120814 | A1 | * | 6/2006 | Lipohar et al. ................ 408/181 |
| 2008/0232915 | A1 | * | 9/2008 | Reinhardt et al. ............ 408/144 |

FOREIGN PATENT DOCUMENTS

| | | | | |
|---|---|---|---|---|
| DE | 194842 | C | * | 4/1907 |
| DE | 3610016 | A | * | 10/1987 |
| DE | 29622294 | U1 | * | 2/1997 |
| JP | 10146707 | A | * | 6/1998 |

* cited by examiner

*Primary Examiner* — Daniel Howell
(74) *Attorney, Agent, or Firm* — Madson IP, P.C.

(57) ABSTRACT

A modular countersink assembly, comprising a drill having an exterior tapered surface, a countersink body having an interior tapered surface for mating with the exterior tapered surface of the drill, and an insert removably secured to the countersink body enables an operator to replace either the drill and/or the insert if one or the other or both become worn. The insert is positioned both axially and radially and may have a PCD cutting edge.

12 Claims, 5 Drawing Sheets

MODULAR PRECISION DRILL COUNTERSINK ASSEMBLY

TECHNICAL FIELD

The present invention relates generally to drill assemblies. More specifically, the present invention relates to modular drill assemblies requiring high precision as used for aircraft fasteners for example.

BACKGROUND

This invention relates to a drill countersink assembly for accurately preparing precision holes in materials for fasteners, specially for aircraft fasteners used to attach aircraft skins to the frame of the aircraft or wing assembly where such fasteners need to fit precisely into the material to provide the optimum strength of the bonded structure and to avoid mismatches that would allow the head of the fastener to be either above or below the skin and thereby increase the drag on the surface of the plane. In particular, this invention is concerned with the ability to accurately match the precise form of the fastener head, matching the angle of the fastener head and fillet radius, so that when positioned in the hole, the fastener head is as perfectly matched to the hole in the material as formed by the drill countersink assembly and flush with the skin of the plane. In addition to increasing the precision of the hole formed by the invention, the invention reduces the costs of preparing such holes by providing an easy to use assembly with replaceable wear components and a reusable countersink body.

Prior to this invention, it was necessary to use a step drill with a fixed countersink construction in order to obtain a cutting tool with the necessary accuracy for preparing the desired match between the fastener and the recess created by the machining process.

Drill countersink assemblies are well known as means of drilling and countersinking a hole in a single operation. U.S. Pat. Nos. 5,915,895; 7,090,447; and 7,131,798 are recent examples of improvements to such assemblies. The designs mentioned in these patents as well as other prior art for drill countersink assemblies, however, do not provide for the necessary accuracy in the assembly to be useful for the purposes of this invention. Specifically, small alignment errors occur in the clamping of the drill into the countersink assembly that creates a slight run out at the tip of the drill relative to the shank of the countersink assembly. Such run out can enlarge the drilled hole creating an unacceptable mismatch between the hole and the fastener body.

A shorter drill countersink assembly that relies on the drill shank for the alignment of the drill point (such as disclosed in U.S. Pat. Nos. 5,071,295 and 7,147,409) avoids the misalignment errors at the drill point. But, these shorter drill countersink assemblies lack the accurate positioning of the countersink insert and the ease of creating that position, whereas that feature is inherent in the present invention.

SUMMARY OF THE INVENTION

In accordance with the present invention, there is provided a modular cutting tool assembly whereby a hole of greater precision can be created with an improved match between the fastener and the recess created by the cutting tool assembly. Such an improved match is very beneficial for positioning of an aircraft fastener flush with the skin of an aircraft structure.

This invention is particularly useful with drilling and countersinking layers of advanced carbon fiber reinforced plastics (CFRP) composites and layers of the advanced composite in combination with layers of titanium or layers of aluminum. CFRP is highly abrasive and creates rapid wear on the cutting edges of the drill and countersink portion of tools presently used in this material. The modular cutting tool assembly of the present invention addresses this rapid wear, making the cost savings significant when drilling and countersinking this material.

The invention uses a three-part modular assembly comprising a drill, an insert, and a body to affix and locate the insert to the drill. This allows for a simple procedure for replacing worn components such as the drill or insert and then reusing the body part of the assembly.

Additionally, a unique feature of this three-part modular assembly is that it is combined in such a way as to improve the accuracy of the assembly while retaining the simplicity of design. Specifically, matching tapered surfaces on the drill piece and in the recess of the body piece allow for a seating of the two pieces together such that someone of limited skill can separate the pieces of the assembly and then reassemble the pieces and repeat the accuracy of the position of the pieces relative to each other in both the axial and radial position.

Further, the invention provides for a reference flat on the drill piece of the assembly such that the radial position of the countersink insert can be accurately positioned both axially and radially to the centerline of the drill. Such position is especially important when the countersink has a form where a radius must match the corresponding radius between the fastener head and the body of the fastener.

Additionally, the drill piece has a second set of opposing flats behind the tapered surfaces positioned at a slight taper such that a locking screw will pull the tapered surfaces of the drill piece and the countersink body piece together and improve the mating of these two surfaces. The combination of mating the tapered surfaces together with the locking screws provide for a reliable assembly that can withstand the cutting forces and the rotational forces of the machine spindle. Also, the assembly will not loosen during use, where loosening would cause the assembly to lose the desired precision of the assembly or would create a danger to the operator.

Further, this invention allows for the use of PCD cutting edges on either the drill cutting edges or the insert cutting edges or both.

BRIEF DESCRIPTION OF THE DRAWINGS

An exemplary embodiment of the invention is provided. Other embodiments will become more fully apparent from the following description and appended claims, taken in conjunction with the accompanying drawings. Understanding that these drawings depict only an exemplary embodiment and are, therefore, not to be considered limiting of the invention's scope, the exemplary embodiment of the invention will be described with additional specificity and detail through use of the accompanying drawings in which:

DETAILED DESCRIPTION

Figure 1:
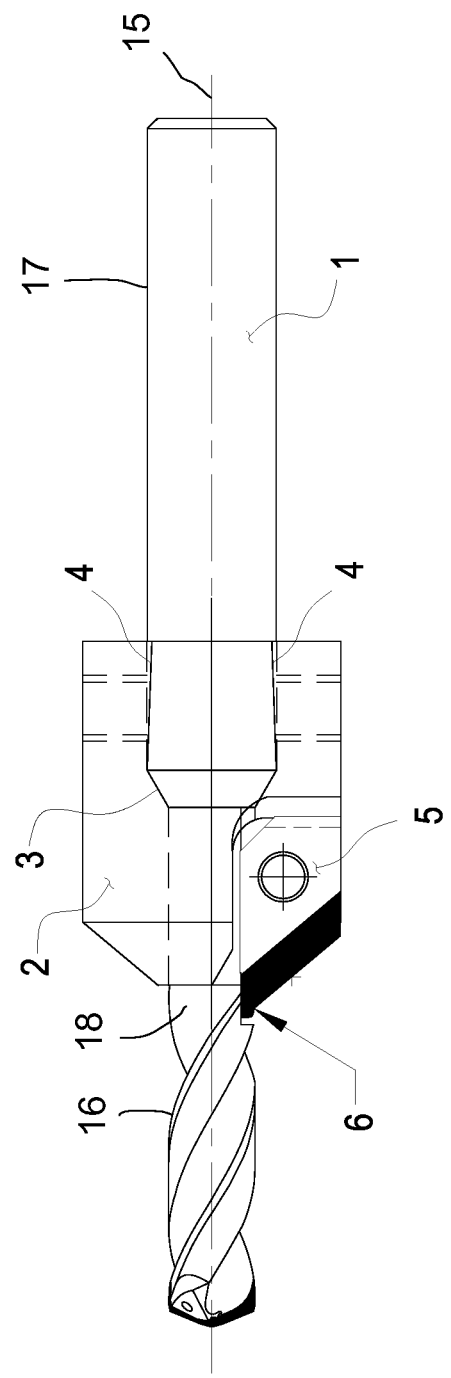
FIG. 1 is a side view of the modular tool assembly consisting of the drill, insert, and body.

FIG. 1 illustrates the cutting tool assembly according to the invention with drill 1, body 2, and insert 5. Drill 1 and the body 2 have matching tapered surfaces 3 that, combined with tapered flat surfaces 4, provide for the precise location of radius cutting edge 6 both axially and radially to the centerline 15 of drill 1.

Figure 3:
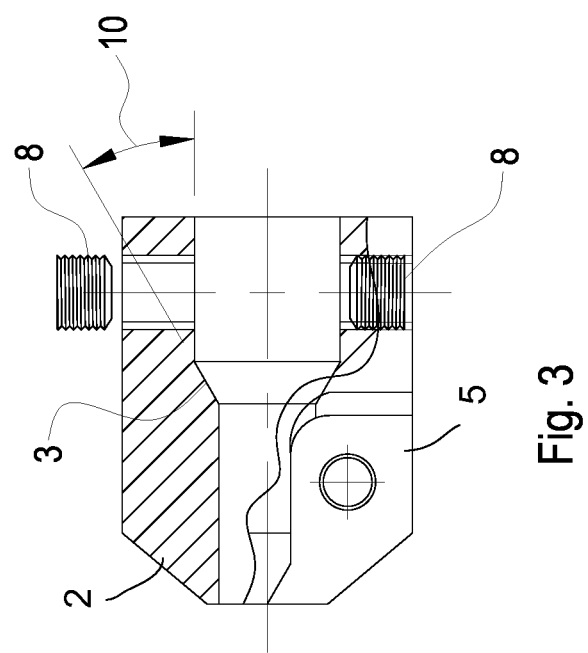
FIG. 3 is a partial cut away sectional view of the countersink body piece of the tool assembly.
Figure 4:
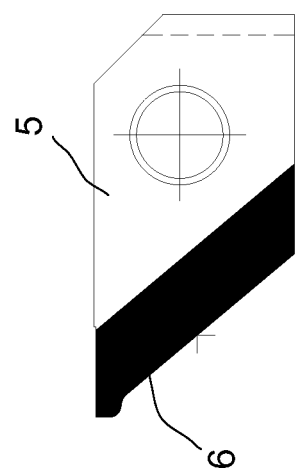
FIG. 4 is side view of the insert piece of the tool assembly.

FIG. 3 illustrates the body 2 of the cutting tool assembly showing angle 10 that provides the tapered surface 3 that is used to create the precise location of the body 2 to drill 1. The taper mating of these two parts of the assembly greatly improves the precision of the location of the insert 5 (shown in FIG. 4) to the assembly.

Figure 5:
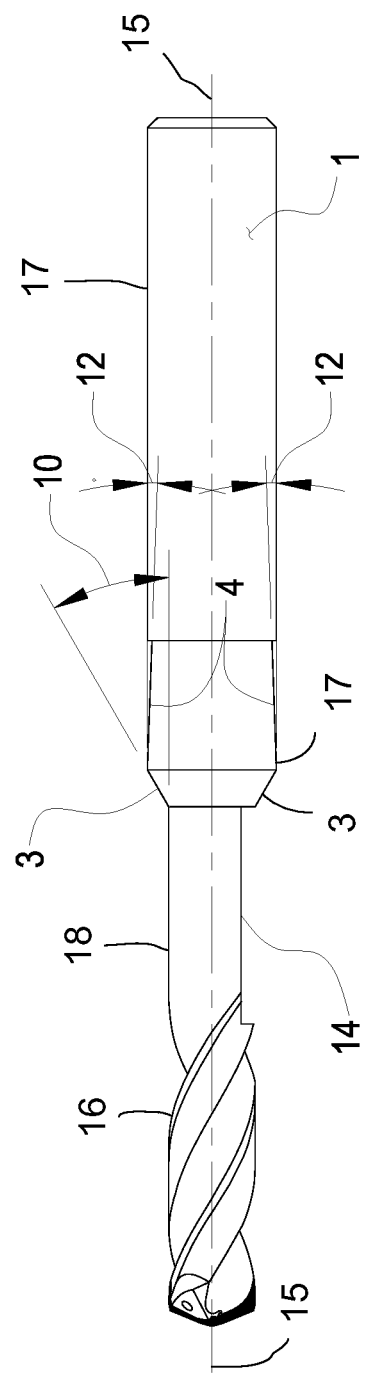
FIG. 5 is a side view of the drill piece of the tool assembly.

FIG. 5 shows opposing flat surfaces 4 which have a slight backtaper of angle 12 on drill shank 17. When the set screws 8 (see FIG. 3) are tighten against flat surfaces 4, the body 2 is pulled against the mating tapered surface 3 such that the body 2 is precisely and rigidly positioned together with drill 1 such that the combined assembly performs equally to the fixed design of the prior art shown in FIG. 2. Tapered surface 3 is formed by the transition from the drill body 18 to the drill shank 17.

Flat 14 in FIG. 5 is a locating flat for the radial position of insert 5 and is disposed on the drill body 18 between flutes 16 and the drill shank 17. The flat 14 receives the insert 5 in abutting engagement. The rigid mating of drill 1 and body 2 into position, combined with flat 14, allows the precision location of insert 5 in both the radial and axial position relative to the axis 15 of the drill 1. The precise location of the insert 5 can then be input into CNC drill machines or other drill machines used in the industry for drilling the hole in the skin of the airplane. The precision of the insert 5 location then allows for the drilling operation to proceed with the location of the countersink accurately cut into the skin thereby allowing for the fastener to sit flush with the skin of the plane.

Figure 2:
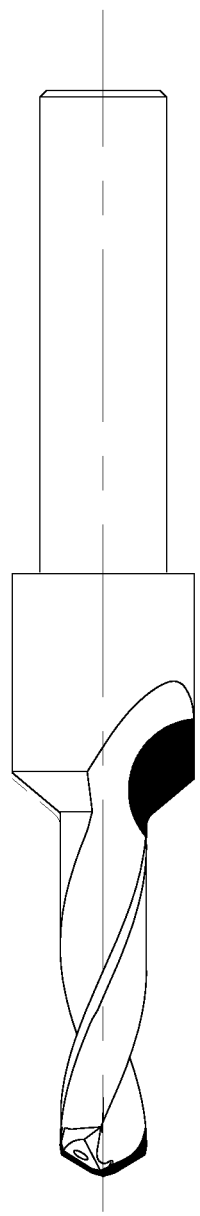
FIG. 2 is a side view of a prior art countersink drill.

The invention provides for significant cost savings over the prior art of FIG. 2 by allowing the use of different inserts 5 according to the form of the fastener head while utilizing the same body 2 and drill 1. This allows for the use of fewer tools to accomplish more fastener shapes reducing the total inventory of tools needed for a given task. Furthermore, inserts of different materials may be used with the same tool. For example, when cutting some materials, it is beneficial to use a PCD cutting edge which is harder than a typical cutting edge.

Additionally, cost savings are realized by the ability to replace the drill 1 or the insert 5 separately while reusing body 2. This allows one to achieve the full use of the cutting edges associated with drill body 18 and insert 5. For example, when drilling deep holes in a very abrasive material, drill body 18 may become dull long before insert 5. The invention allows for the replacement of drill 1 while continuing the use of insert 5 thereby optimizing the life of each cutting edge separately. The accurate location of the drill 1 to the body 2 and insert 5 makes it possible for a person of limited skills to reassemble the drill countersink assembly quickly without time consuming test drilling to ensure the location of the cutting edges relative to one another.

The invention also makes it possible to use the same cutting conditions now employed with the rigid tool of the prior art. The combination of the tapered surface 3, flat surfaces 4, and set screws 8 form an assembly equal in rigidity to the prior art so that aggressive cutting conditions can be used without failure of the assembly.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A modular countersink assembly, comprising:
   a drill having a centerline and an exterior tapered surface;
   a countersink body having an interior tapered surface, the countersink body being removably secured to the drill to mate the interior tapered surface in seated engagement with the exterior tapered surface of the drill; and
   an insert removably secured to the countersink body, the insert and the countersink body being positioned axially and radially to the centerline of the drill.

2. A modular countersink assembly of claim 1, wherein the drill has a flat for receiving the insert in abutting engagement.

3. A modular countersink assembly of claim 1, wherein the countersink body is removably secured to the drill by at least one set screw.

4. A modular countersink assembly of claim 3, wherein the drill has a drill shank with a slight back taper and the at least one set screw engages the slight back taper such that tightening the at least one set screw pulls the interior tapered surface of the countersink body into the exterior tapered surface of the drill.

5. A modular countersink assembly of claim 1, wherein the insert has a PCD cutting edge.

6. A modular countersink assembly, comprising:
   a drill comprising a drill body and a drill shank, the drill having an exterior tapered surface joining the drill body and the drill shank;
   a countersink body removably secured to the drill by at least one set screw, the countersink body has an interior tapered surface for mating with the exterior tapered surface of the drill in seated engagement; and
   an insert removably secured to the countersink body, wherein the drill shank has opposing flats having a back taper for engaging the at least one set screw for removably securing the countersink body.

7. A modular countersink assembly of claim 6, wherein the drill body has a flat for receiving the insert in abutting engagement.

8. A modular countersink assembly of claim 6, wherein the assembly of the drill, the countersink body, and the insert forms a fillet radius cutting edge.

9. A modular countersink assembly of claim 6, wherein the insert has a polycrystalline diamond cutting edge.

10. A modular countersink assembly of claim 6, wherein tightening the at least one set screw pulls the interior tapered surface of the countersink body into the exterior tapered surface of the drill.

11. A drill for use in a modular countersink assembly, the drill comprising:
    a drill body having a flat for receiving a cutting insert in an abutting engagement;
    a drill shank having opposing flats, the opposing flats having a back taper; and
    a tapered surface transitioning from the drill body to the drill shank, the tapered surface for mating with an interior tapered surface of a countersink body.

12. A modular countersink assembly of claim 1, wherein the assembly of the drill, the countersink body, and the insert forms a fillet radius cutting edge.

* * * * *